UNITED STATES PATENT OFFICE.

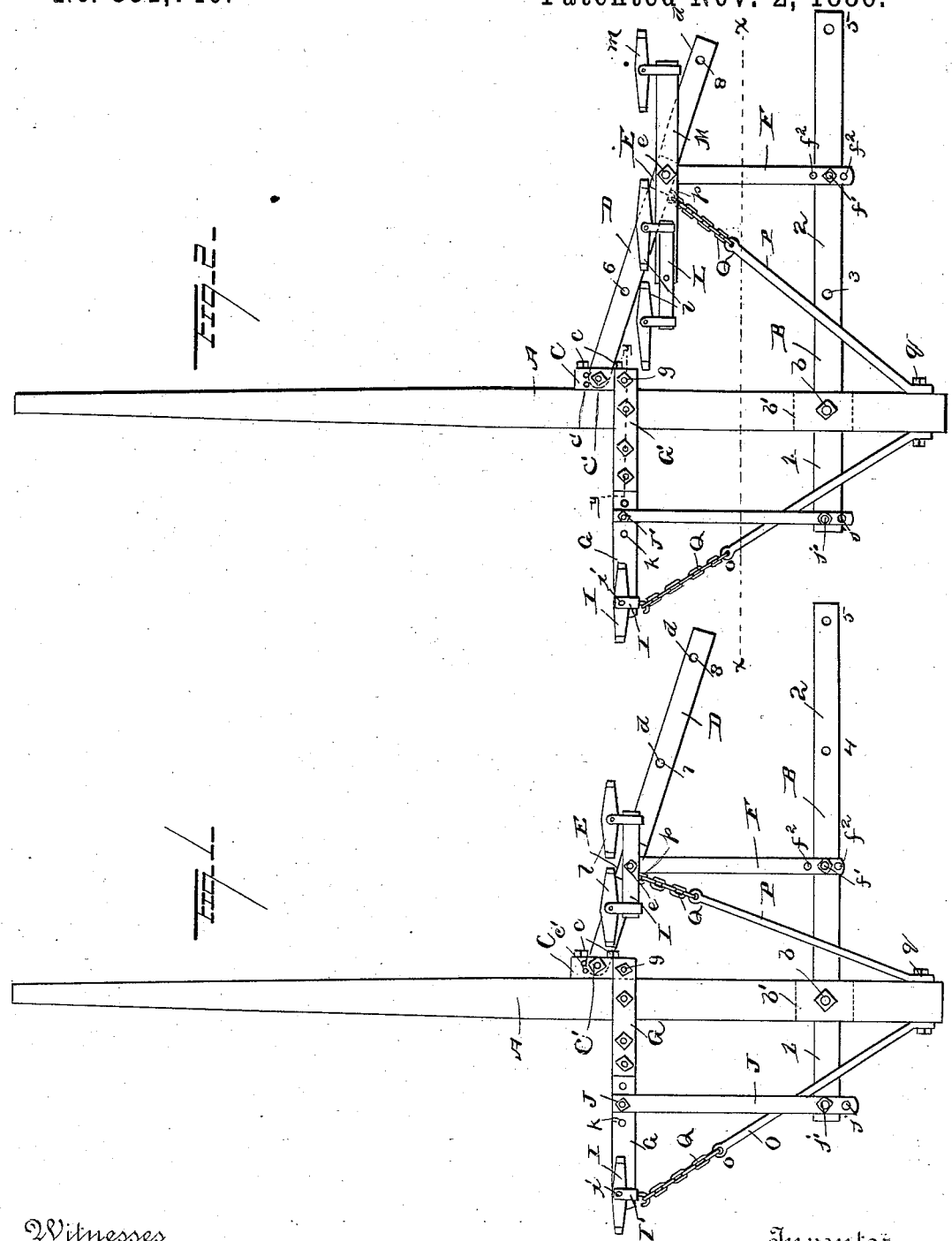

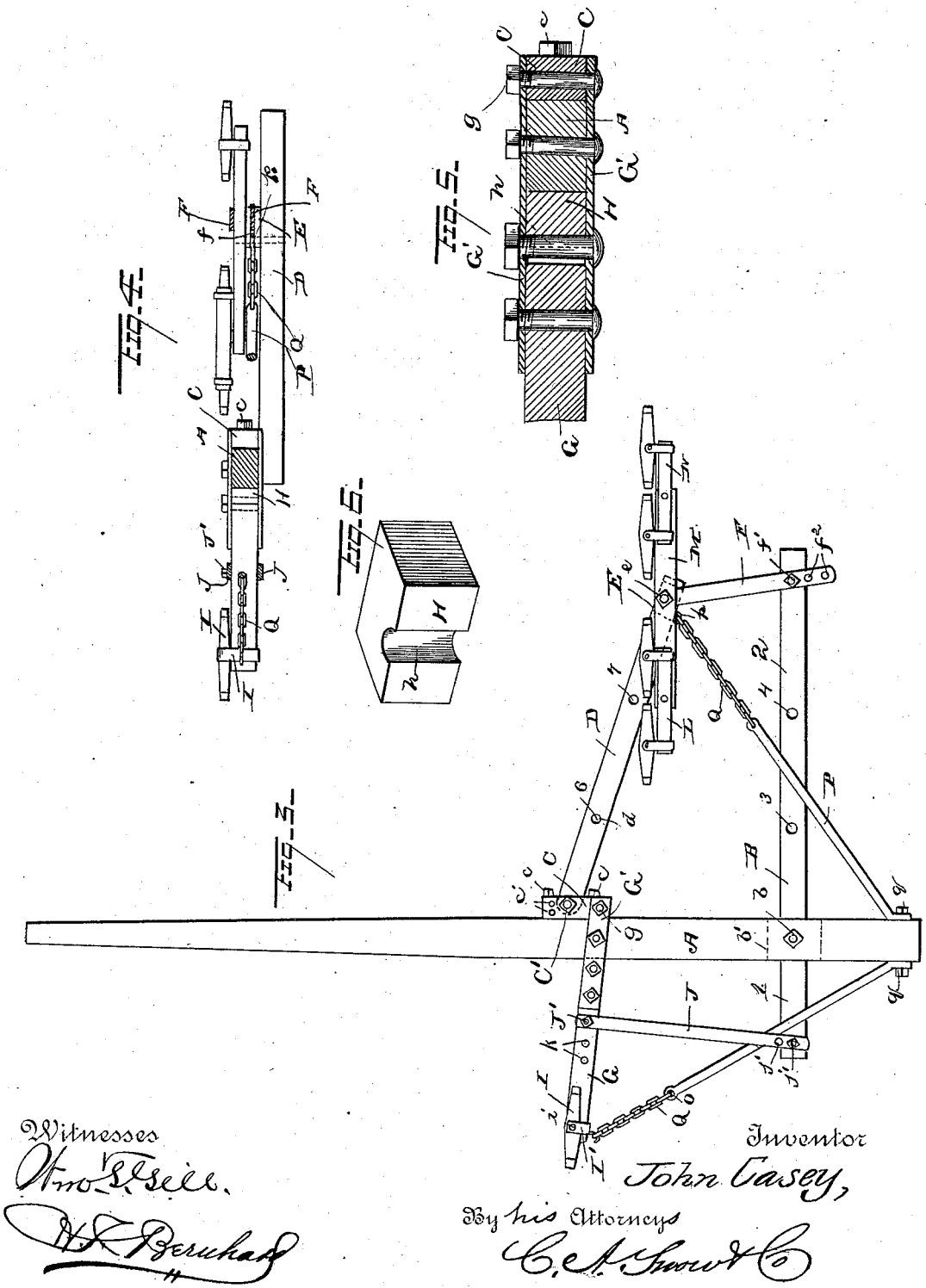

JOHN CASEY, OF LAWLER, IOWA.

DRAFT-EQUALIZER.

SPECIFICATION forming part of Letters Patent No. 351,740, dated November 2, 1886.

Application filed July 22, 1886. Serial No. 208,763. (No model.)

*To all whom it may concern:*

Be it known that I, JOHN CASEY, a citizen of the United States, residing at Lawler, in the county of Chickasaw and State of Iowa, have invented a new and useful Improvement in Draft-Equalizers, of which the following is a specification.

My invention relates to improvements in draft-equalizers especially adapted for use in harvesting machines; and it consists of the peculiar combination and novel construction and arrangement of the various parts for service, substantially as hereinafter fully set forth, and particularly pointed out in the claims.

The primary object of my invention is to provide an improved draft-equalizer for harvesting-machines, which can be quickly adapted to three, four, and five draft animals by a simple and easily-performed adjustment of a few of its parts, and which shall be so arranged that the apparatus will be easily turned in the proper direction without effort on the part of the animal nearest the grain, the tongue or draft-pole farthest from the grain, in their proper places, when the machine is at rest or in backing it.

A further object of my invention is to provide the equalizer with check chains and rods which shall be so arranged that the draft on the traces of the animals will be brought in a straight line and the neck-yokes be relieved of a considerable portion of the strain that is common in devices as at present used, which chafe the neck and shoulders of the animal.

My improved equalizer is also very simple, strong, and durable in construction, thoroughly effective and reliable in operation, easily and quickly adjusted, and can be manufactured and sold at less cost than other devices known to me.

In the accompanying drawings, which illustrate a draft-equalizer embodying my invention, Figure 1 is a top or plan view of a three-horse equalizer. Figs. 2 and 3 are like views of a four and five horse equalizer, respectively. Fig. 4 is a vertical cross-sectional view on the line $x\,x$ of Fig. 2. Fig. 5 is an enlarged cross-sectional view on the line $y\,y$ of Fig. 2. Fig. 6 is a detached view of the block H.

Referring to the drawings, in which like letters of reference denote corresponding parts in all the figures, A designates the tongue or draft-pole of a harvesting-machine of any preferred class, my improved draft-equalizer being adapted for service on any class of harvesting-machine. At or near the rear end of this tongue I pivotally connect a double-tree, B, which is arranged beneath the tongue to bear on the lower side thereof. This double-tree B is pivoted to the tongue by means of a through-bolt, $b$, and braced by a strap, $b'$, and the length of the double-tree on opposite sides of the pole is unequal, the end 1 on the side of the tongue nearest the grain being considerably shorter than the end 2 on the opposite side of the tongue, the said longer end 2 being provided with a series of openings, 3, 4, and 5, for a purpose to be hereinafter explained.

To one of the sides of the tongue or draft-pole farthest from the grain, or on the side of the longer end 2 of the doubletree B, I rigidly affix or secure a brace-lock, C, by means of through-bolts $c$, which is of any suitable size or material. This block is held rigidly and immovably in place on the tongue, and it has a series of vertical openings, $c'$, arranged transversely across the same, through one of which openings passes a pivot-bolt or pin, C', to connect the inner end of a horizontal brace, D, to the block C, as is obvious. This brace D is arranged in an inclined or diagonal position with relation to the tongue A, on the same side thereof as the longer end 2 of the doubletree B, and the inner end of the brace is pivotally and adjustably connected to the brace-block C by means of the bolt C', as before described, so that the brace is free to move or swing for a limited distance under the strain of the draft-animals thereon and to be adjusted to the required leverage, according as the apparatus is adapted for a three, four, or five horse equalizer. The opposite or free end of this pivoted swinging brace is provided with a series of vertical openings, $d$, which correspond in number with the similar openings of the doubletree B, and which for the sake of convenience in referring to hereinafter I have designated by the numerals 6, 7, and 8.

E designates an adjustable support, which bears on the upper side of the pivoted brace D and is secured thereto by a bolt and nut, $e$, which passes through a suitable opening in the support and one of the vertical openings $d$ of the pivoted brace D. The function of this support E is to elevate the double-tree and whiffletrees of the draft-animals on the side of the tongue farthest from the grain to substantially the plane of the whiffletree on the opposite side of the tongue nearest the grain, so that all of the whiffletrees of the equalizer are in line to insure a proper and straight draft. The support E is adjustably connected to the pivoted brace, so that the leverage of the brace and the double-tree B can be varied proportionally to the power or draft of the animals upon the said brace, and also for the purpose of holding the whiffletrees of the various draft-animals in their proper places, and for accommodating a greater or less number of whiffle and double trees—as, for instance, when but three horses are to be connected to the equalizer, the support is adjusted nearer to the pivot of the brace D, so that the bolt $e$ will pass through the opening 6, as shown in Fig. 1. When four horses are connected to the equalizer, the support E is moved farther away from the pivot of the brace, and its bolt D' passes through the opening 7, as in Fig. 2, and when five horses are connected to the device, the support is moved still farther away from the pivot of the brace to the extremity of the same, and its bolt $e$ passes through the opening 8. (See Fig. 3.)

The support E is provided with a slot or mortise, $f$, in which is fitted one of the ends of the connecting-straps F, intermediate of the brace D and the longer end 2 of the pivoted double-tree B. There are two of these connecting straps or links F provided, which are arranged parallel with each other, one of the ends of the straps being pivotally connected with the pivoted brace D by the same pivot-bolt, $e$, which connects the support E to the brace D, and the opposite ends of the said straps are in turn pivotally connected by a bolt, $f'$, which passes through suitable openings in the straps and one of the openings in the longer arm 2 of the double-tree B. These straps serve to communicate the motion of the pivoted brace to the double-tree B and to limit the play or movement of the brace, as will be readily understood.

G designates a lever which is arranged in a horizontal position on the opposite side of the tongue to the brace D. The inner end of this lever is connected to a pivot-bolt, $g$, which is supported in horizontal straps G', that are rigidly and firmly secured to the blocks C and the tongue A by screws, bolts, or other suitable fastening devices. These straps G' are thus immovably held in place on the tongue and the block C, and the pivot-bolt $g$ passes through suitable openings in the said straps, by which it is supported, and between the straps is interposed or fitted a block, H, that lies between the tongue and the bolt to prevent the latter from coming in contact with the tongue and to permit the free movement of the inner end of the lever without contact with the tongue, one of the vertical faces of the block H being recessed or grooved vertically, as at $h$, to permit the pivot-bolt to work or move therein, and at the same time hold it from contact with the tongue.

To the outer free end of the pivoted lever G is connected a single or whiffle tree, I, which is of any approved pattern or make. The whiffletree is designed for a single horse, which is to be attached to the machine on the side of the tongue nearest to the grain, and the whiffletree is pivoted to the lever by a bolt, $i$, which passes through the whiffletree and the lever. A strap, I', embraces the free end of the lever and the whiffletree, and the bolt $i$ also passes through the strap by which the parts are braced, and this strap has a ring or eye, $i'$, connected therewith, for a purpose to be explained hereinafter.

J designates connecting straps or braces, two of which are provided between the pivoted lever G and the shorter end 1 of the double-tree B to communicate the motion of the lever to the double-tree. The ends of the strap J that are connected to the double-tree are provided with two or more perforations, $j$, through which is passed a pivot-bolt, $j'$, which also passes through the free shorter end 1 of the double-tree to connect the straps to the same. It will be seen that the straps J can be lengthened or shortened by simply removing the pivot-bolt and passing it through either one of the openings in the straps, and the opposite ends of the straps are pivotally connected to the lever G by a through-bolt, J', which passes through the straps and one of a series of vertical openings, $k$, in the lever G, the openings $k$ being arranged longitudinally of the lever, as shown.

It will be observed from the foregoing description, taken in connection with the drawings, that the brace D and lever G are arranged on opposite sides of the tongue or draft-pole, and one above the other, so that they are free to turn or move independently of and without interference with each other.

When a three-horse equalizer is desired, the support E is adjusted near to the pivot of the brace D, so that the bolt thereof will pass through the opening 6, and to this support is pivotally connected a double-tree, L, which carries two whiffletrees, $l$, which are arranged at opposite ends of the double-tree. This double-tree and the whiffletrees are of the ordinary or any preferred form, and the manner of supporting and pivoting them is the same as that in common use, and I have therefore deemed it unnecessary to more fully describe it herein.

By adjusting the support E nearer to the pivot of the brace D the front ends of the links F are also caused to be nearer to the pivot of the brace, as the straps or links are adjustable with the support, and the opposite ends of the straps or braces are provided with a series of openings, $f^2$, whereby the links may be lengthened or shortened, as may be desirable or necessary. In the present instance the connecting links or straps are lengthened by passing the pivot-bolt through the openings nearest the ends thereof, and the rear ends of the links are also moved nearer to the pivot of the double-tree, the bolt passing through the opening 3 therein. The front end of the straps or links J are connected to the middle of the lever G by the pivot-bolt passing through the middle opening therein.

It will thus be seen that one draft-animal is connected to the whiffletree on the side of the pole nearest the grain, and that two of the draft-animals are connected to the whiffletrees l on the opposite side of the tongue farthest from the grain, when the device is adapted for service as a three-horse equalizer.

When a four-horse equalizer is used, the support E is adjusted to adapt the bolt e to pass through the opening in the brace D, and to the said support is pivoted a double-tree, M, which carries a single-tree, m, at its outer end, and at its inner end the double-tree L, with its two single-trees, l. One of the draft-animals of the four-horse equalizer is arranged on the side of the tongue nearest the grain, and the remaining three are arranged on the opposite side farthest from the grain, being connected to the whiffletrees l l and m.

In a five-horse equalizer the support E is moved to its outermost extremity of the brace D, and its bolt e passes through the opening 8, and to this support is connected the double-tree M, which carries the double-tree L at one end, and another double-tree, N, at the other end, each of the double-trees L and N carrying a single-tree at each end. The single-draft animal is arranged on the side of the tongue nearest the grain, as in the three and four horse equalizers heretofore described, and the remaining four animals are arranged on the opposite side of the tongue, being connected to the single-trees of the double-trees L N.

O P designate check-rods, which are arranged on opposite sides of the tongue, and connected thereto and to the brace D and lever G to insure a straight draft in the traces of the draft-animals. The rear ends of the check-rods, which are arranged in a diagonal or inclined position with relation to the tongue A, are connected to the tongue at a point in rear of the double-tree B by a single bolt, q, which passes through the tongue and the rear ends of the check-rods, by which they are rigidly secured in place, and the front ends of these check-rods are provided with chains Q, or other like pliable or flexible means, to adjustably connect the check-rods to the brace D and the lever G. The chain Q of the check-rod O is connected to the eye of the strap I', and the said rod O has an open eye, o, by means of which one or the other of the links of the chains Q can be connected to the rod to shorten or lengthen the chain. The chain Q of the check-rod P is connected to an open hook, p, that is fitted in the mortise or slot in the support E, and held in place by the bolt e therein, and the chain of the said rod P can be lengthened or shortened, as desired, by dropping one or more of the links thereof.

This being the construction of my improved draft-equalizer, the operation thereof is as follows: To convert the device from a five-horse equalizer to a four-horse equalizer, the double-tree N is detached from the outer end of the double-tree M, and a single tree is substituted therefor, so that three animals can be connected to the whiffletrees l l m on one side of the tongue, and the support E is moved from the opening 8 in the brace D to the opening 7, the braces or straps F being moved with the support, and connected at their opposite ends to the opening 4 in the double tree B. The chain Q of the check-rod P is shortened to a suitable extent, and the braces or straps J are shortened and adjusted at their front ends to the middle one of the openings k in the lever G, as clearly shown in Fig. 2 of the drawings.

To convert the device from a four-horse equalizer to a three-horse equalizer, the support E is moved to the opening 6 in the pivoted brace D, and the strap-braces F are likewise adjusted with the support, the braces being lengthened and adjusted to the opening 3 in the double-tree B. The double-tree M and the single-tree m thereon are also detached from the double-tree M and connected to the support E in the manner described, the chain Q of the check-rod P being correspondingly lengthened, while the braces J and the check-rod O are undisturbed.

To convert the three horse equalizer to a four-horse equalizer, and to also convert the four to a five horse equalizer, it is only necessary to reverse the above-described operations.

It will be observed from the foregoing description, taken in connection with the drawings, that I provide an improved draft-equalizer, which can be easily and readily adapted for service as a three, four, and five horse equalizer by a few simple adjustments of the parts thereof.

The apparatus can be manufactured and sold for less cost than other devices of the same class known to me, and it is also very simple and strong in construction and easily applied to any class of harvesting-machines.

The brace D and the support E can be arranged on either side of the tongue, to adapt the equalizer for service on right and left hand cut harvesting-machines.

I do not desire to confine myself to the exact details of construction and form and proportion of parts herein shown and described, as I am aware that changes can be made therein without departing from the principle of my invention.

Having thus fully described my invention, I claim—

1. In a draft-equalizer, the combination of a swinging brace carried by the tongue, an adjustable support on the brace, to which the double and whiffle trees are connected, a pivoted lever carrying a single-tree arranged on the opposite side of the tongue to the brace, and the adjustable support thereon, the double-tree B, pivoted to the tongue, and the brace-straps intermediate of the double-tree B and the lever and brace, substantially as described, for the purpose set forth.

2. In a draft-equalizer, the combination of a swinging brace carried by the tongue, a support for the double-trees fitted on the brace and adjustable longitudinally thereof, a pivoted lever having a single-tree, and also carried by the tongue and arranged on the opposite side thereof to the brace, a double-tree, B, and the adjustable brace-straps F J, intermediate of the double-tree and the brace and lever, substantially as described, for the purpose set forth.

3. In a draft-equalizer, the combination of a brace-block affixed rigidly to the tongue, a swinging brace pivotally connected to the block, an adjustable support for the double-trees carried by the said brace, the pivoted lever arranged on the opposite side of the tongue to the brace and carrying a single-tree, the brace being arranged on a plane beneath that of the pivoted lever, and the adjustable support on the brace being arranged on substantially the same plane as the pivoted lever, whereby the whiffletrees on the lever and brace are located on the same horizontal plane, the double-tree B, pivoted to the draft-tongue, and the brace-straps F J, intermediate of the said double-tree and the pivoted lever and brace, substantially as described, for the purpose set forth.

4. In a draft-equalizer, the combination of a brace-block affixed rigidly to the tongue, the straps secured to the block or tongue, a lever, G, carrying a single-tree and pivoted to the straps by a through-bolt, a block, H, interposed between the inner extremity of the lever and the tongue and fitted between the straps, a brace pivoted to the brace-block and carrying a support for the double-tree, the double-tree B, pivoted to the tongue, and the intermediate brace-straps, substantially as described, for the purpose set forth.

5. In a draft-equalizer, the combination of a brace-block affixed to a tongue, a brace pivotally connected thereto, the straps affixed to the block or tongue, a lever pivoted to the straps and arranged on the opposite side of the tongue to the brace, a block fitted between the straps, the double-tree B, and the brace-straps, substantially as described.

6. In a draft-equalizer, the combination of a swinging brace, an adjustable support for the double-tree carried by the brace, a pivoted lever having a single-tree and arranged on the opposite side of the tongue to the brace, a double-tree, B, and the brace-straps F J, intermediate the double-tree, the lever, and the brace, the said brace-straps F J being arranged at an angle to or in an inclined position with relation to the tongue, substantially as described, for the purpose set forth.

7. In a draft-equalizer, the combination of a brace-block affixed rigidly to the tongue, a brace adjustably and pivotally connected to the brace-block, an adjustable support for the double-trees carried by the brace, a pivoted lever on the opposite side of the tongue to the brace and having a single-tree, the double-tree pivoted to the tongue in rear of the lever and brace, and the brace-straps intermediate of the double-tree B and the lever and brace, substantially as described, for the purpose set forth.

8. The combination of a swinging brace, a support for the double-trees fitted and adjustable longitudinally on the brace, a pivoted lever carrying a single-tree, a double-tree, B, the brace-straps F, connected to the support and the double-tree B, and the brace-straps intermediate of the pivoted lever and the double-tree, substantially as described.

9. The combination of a swinging brace, an adjustable support thereon for the double-tree, a pivoted lever carrying a single-tree, a double-tree, B, pivoted to the tongue at an intermediate point of its length, so that its ends 1 and 2, on opposite sides of the tongue, are of unequal lengths, the brace-straps F, arranged at an angle to the tongue and pivotally connected at one end to the support and adjustably connected at their other ends to the longer end, 2, of the double-tree B, and the brace-straps J, intermediate of the pivoted lever and the shorter end, 1, of the double-tree, substantially as described, for the purpose set forth.

10. The combination of a swinging brace, an adjustable support thereon for the double-tree, a pivoted lever having a single-tree, a double-tree, B, pivoted to the tongue at an intermediate point of its length, so that its ends 1 and 2, on opposite sides of the tongue, are of unequal length, the brace-straps F, connected at one end to the support and adjustably and pivotally connected at its opposite end to the longer end, 2, of the double-tree B, and the brace-straps J, adjustably connected at one end to the pivoted lever between the ends of the latter and at their opposite ends to the shorter end, 1, of the double-tree B, the rear ends of the said brace-straps F J being detachably and adjustably connected to the ends of the double-tree B, so that the braces can be lengthened and shortened at will, substantially as described, for the purpose set forth.

11. The combination, in a draft-equalizer, of a swinging brace, an adjustable support thereon for the double-tree, a pivoted lever having a single-tree, a double-tree, B, pivoted to the tongue, the brace-straps, and the check-rod intermediate of the brace and tongue, substantially as described, for the purpose set forth.

12. The combination, in a draft-equalizer, of a swinging brace, an adjustable support thereon for the double-tree, a pivoted lever, G, having a single-tree, a double-tree, B, pivoted to the tongue, the brace-straps intermediate the double-tree and the lever and brace, and the check-rod connected at one end to the tongue and adjustably connected at its opposite end by an intermediate chain, Q, with the adjustable support, whereby the check-rod can be lengthened and shortened at will, substantially as described, for the purpose set forth.

13. In a draft-equalizer, the combination of a brace-block affixed to the tongue, a brace adjustably and pivotally connected to the brace-block, a support for the double-tree adjustable longitudinally on the brace, the straps G', a lever pivoted on the straps and having a single-tree, the block fitted between the straps, a double-tree, B, pivoted to the tongue and having its ends of unequal length, the brace-straps F, intermediate of the support and the longer end of the double-tree, the brace-straps J, connecting the pivoted lever and the shorter end of the double-tree, and the check-rods secured to the tongue and adjustably connected to the support and the pivoted lever, substantially as described.

In testimony that I claim the foregoing as my own I have hereto affixed my signature in presence of two witnesses.

JOHN CASEY.

Witnesses:
G. TOUNEY,
JOHN DYGERT.